United States Patent
Gage

(10) Patent No.: US 6,741,904 B1
(45) Date of Patent: May 25, 2004

(54) REAL TIME DESIGN, DEVELOPMENT AND DELIVERY COLLABORATIVE APPAREL SOLUTION DIGITAL PLATFORM

(76) Inventor: Benjamin C. Gage, 1862 Gingercake Cir. #206, Rock Hill, SC (US) 29732

( * ) Notice: Subject to any disclaimer, the term of this patent is extended or adjusted under 35 U.S.C. 154(b) by 225 days.

(21) Appl. No.: 10/078,318

(22) Filed: Feb. 18, 2002

Related U.S. Application Data

(60) Provisional application No. 60/269,575, filed on Feb. 16, 2001.

(51) Int. Cl.[7] .......................... G06F 17/50; G06F 17/60
(52) U.S. Cl. ..................... 700/132; 705/26; 707/104.1
(58) Field of Search ................... 700/132, 130, 700/131, 133, 134; 705/1, 26, 27, 28; 703/1; 707/104.1

(56) References Cited

U.S. PATENT DOCUMENTS 6,381,510 B1 * 4/2002 Amidhozour et al. ....... 700/130
6,473,671 B1 * 10/2002 Yan ............................ 700/134

* cited by examiner

*Primary Examiner*—Peter Nerbun
(74) *Attorney, Agent, or Firm*—Kennedy Covington Lobdell & Hickman, LLP

(57) ABSTRACT

A real time design, development and delivery collaborative apparel solution digital platform is provided. The platform includes a virtual design library module, a technical designer network module, an eCAD module for facilitating design collaboration between a label owner and one or more approved designers, a production/distribution source network module, a collaborative web portal module for translating designs in a plurality of different CAD software applications to one or more of a plurality of unrelated production software applications, and a pre-production engineering resources module for facilitating the selection of pre-production engineers and engineering methods for various production processes.

1 Claim, 1 Drawing Sheet

REAL TIME DESIGN, DEVELOPMENT AND DELIVERY COLLABORATIVE APPAREL SOLUTION DIGITAL PLATFORM

CROSS-REFERENCE TO RELATED APPLICATIONS

This application is entitled to the benefit of, and claims priority to, U.S. Provisional Patent Application Serial No. 60/269,575, filed Feb. 16, 2001, entitled "REAL TIME DESIGN, DEVELOPMENT AND DELIVERY COLLABORATIVE APPAREL SOLUTION DIGITAL PLATFORM," the entirety of which is incorporated herein by reference.

BACKGROUND OF THE PRESENT INVENTION

1. Field of the Present Invention

The present invention relates generally to the field of designing and producing sewn products, and, in particular, to a digital platform for rapid product innovation and deployment of sewn products.

2. Background Art

A need exists for a digital platform for more efficiently bringing sewn products to market. This need is driven by three market factors. First, the textile industry lags behind other industries in adopting Internet tools to achieve supply-chain integration advantages. As reported in Textile World, the industry has experienced over-investment the past ten years in plants and machinery; under-investment in information systems, supplier/customer partnerships and strategic alliances; and product innovation; and slow response to growing global market opportunities.

Second, current solutions to these problems are inadequate. The current generation of e-commerce solutions consists mostly of trading exchanges for procurement of raw materials, components and finished goods. Current solutions typically only address order processing and tracking. Examples include ecomtextile.com and fasturn.com. While these solutions could potentially improve the cost of goods, this area has largely been addressed by offshore sourcing, and does not significantly address reducing operating cost. In turn, offshore sourcing has severely hampered the industry's ability to respond to today's rapidly changing markets.

Third, the current e-commerce model is inadequate. One provider of next-generation e-commerce tools, lectra.com, is a European company pursuing a traditional software business model. This approach would require that the U.S. apparel industry dramatically change course, to invest significant resources in systems, software, training, and product design talent. In fact, the strong trend is to neglect the product design and product management functions, challenging the existence of traditional players and fostering emerging start-up brands.

As a result of these factors, the industry has two choices— to invest significant dollars and resources in existing and emerging tools that do not address the real need. As a result, a need exists for an innovative digital platform which will provide value added fashion styling and technology solutions to enable rapid, cost-effective and collaborative product design and delivery.

SUMMARY OF THE PRESENT INVENTION

Briefly summarized, the present invention relates to a "real time", digital platform solution for collaborative Design, Development and Delivery of apparel for designers, manufacturers and retailers. The platform will serve as the "go to" resource for all apparel label owners and their partners that seek innovative fashion styling and new, web-based solutions for developing products quickly and collaboratively. To accomplish this, the entire product life cycle is "web-enabled."

With this collaborative solution, the ability has been created in concept to provide all of the products and services needed to integrate the industry electronically—from manufacturer to consumer—into one interoperable and collaborative digital platform. The ultimate goal is to offer outsourced collaborative solutions for user friendly, digitization of the whole product life cycle—from concept and design through electronic merchandising and distribution.

The present invention will serve as an Application Service Provider (ASP), providing solutions that can:

- significantly reduce time and cost to market by up to 300%
- enable designers, retailers and manufacturers to focus on their core business, not on costly and resource-intensive technology development and support, and
- revitalize the U.S. textile/apparel industry though efficiencies and coordination of scarce and dispersed talent.

Typical delivery lead times from the larger, more established brands is 4 to 8 months due to a layered product management hierarchy and off shore production sourcing. The digital platform, which will enable complete collection design and delivery in less than 3 months and as quick as 3 days, plans to utilize primarily domestic sourcing and a singular layer, fully Integrated Product Team (IPT), with membership from enterprise partners as well as the client. Such rapid production cycles will enable label owners to lower costs of development, to integrate design/development resources into one central location, to minimize managerial hierarchies and to utilize domestic sources of production.

BRIEF DESCRIPTION OF THE DRAWINGS

Further features, embodiments, and advantages of the present invention will become apparent from the following detailed description with reference to the drawing, wherein.

DETAILED DESCRIPTION OF THE PREFERRED EMBODIMENTS

Figure 1:
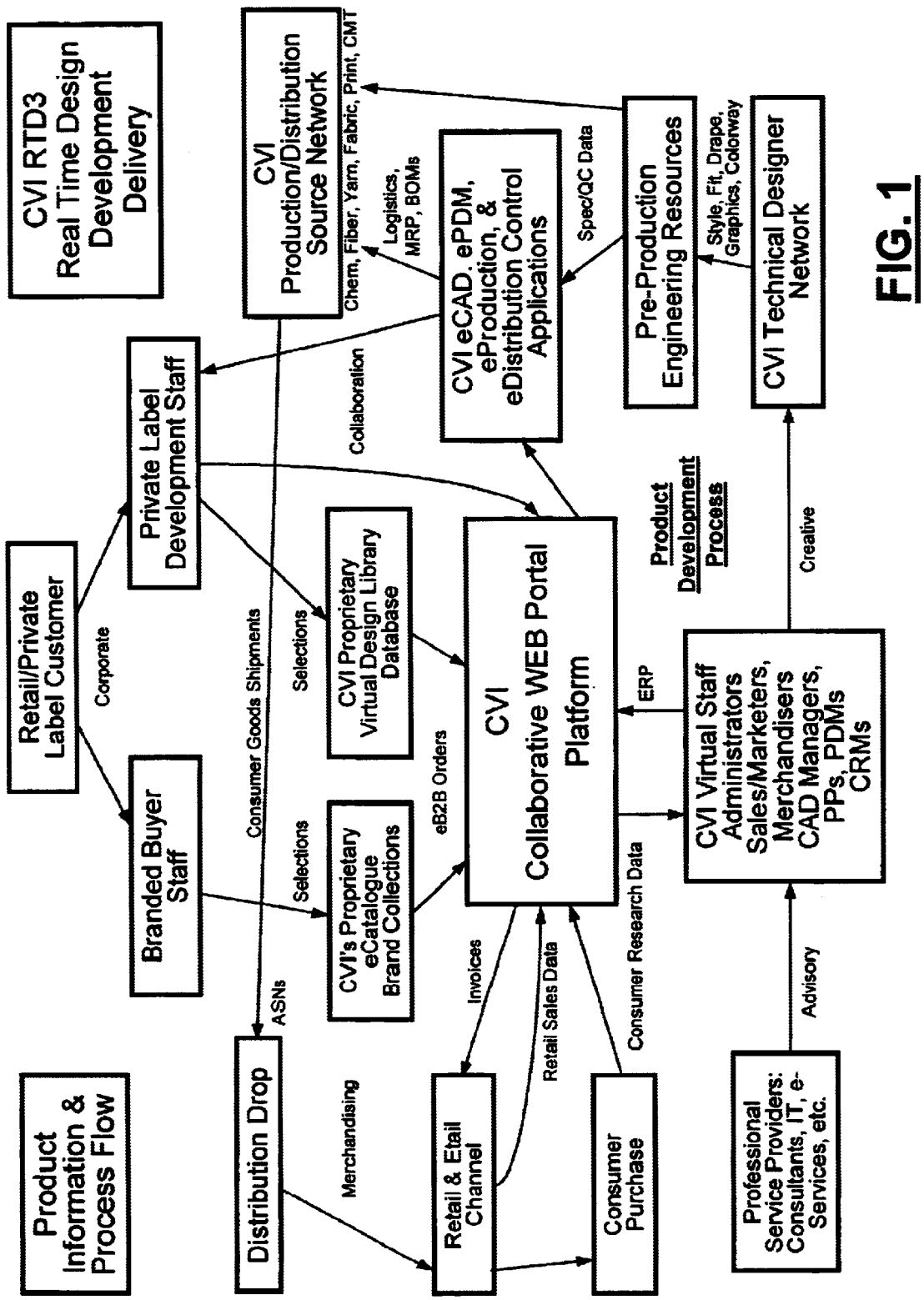
FIG. 1 is a schematic diagram of the product information and process flow for a real time design, development and delivery collaborative apparel solution digital platform in accordance with the preferred embodiments of the present invention.

As illustrated in FIG. 1, the collaborative apparel solution ("CAS") of the present invention is a collaborative platform of digital solution offerings, including a Virtual Design Library (VDL) built with CAD solution technology. The VDL will serve as a digital resource of consistently updated style concepts and design portfolios, and input from the portal's network of creative designers and merchandisers. Consumer needs are at the center of this product solutions strategy for private labelers. Thus, domestic production becomes the advantage due to the requirement for shortened product cycles, possibly leading to an upturn in domestically sourced apparel/textiles.

The CAS platform of solutions enables a low cost product deployment strategy due to a high tech approach. Electronic data gathered at the point of purchase forms the basis for product planning and design. Product planning and design is based on continually updated market intelligence. The ultimate strength of the solution is not vertical integration, but in virtual integration of the industries' network of designers, suppliers, and retailers at one focal point. The goal is simple—to automate the product life cycle using web technology.

To respond to specific market needs, the solution shall provide a standard platform for:

- Integrated computer aided design and merchandising system (CAD/CAM)
- A detailed costing module to identify and implement necessary price increases to insure profitability
- A sophisticated WEB site and additional electronic commerce capabilities that includes a new electronic sales/distribution channel technology with "real time" collaborative design capabilities
- An electronic data interchange (EDI) distribution/logistics server system
- Integration of a virtual warehouse inventory tracking program and product data management (PDM) system The portal will integrate modules to automate the product life cycle and to enable marketplace collaboration:

1. Product concepting, design, and pre-production engineering
2. Quality and process control
3. Procurement
4. Project management/tracking
5. Production
6. Distribution
7. Electronic merchandising & sales
8. Source Facilities Modules implementing these processes are more fully described hereinbelow.

The Proprietary Virtual Design Library and Technical Designer Network Modules The first two modules are the "Proprietary Virtual Design Library" module and the "Technical Designer Network" module. Completed designs are housed on the Platform in a digital design library (with access security) which will allow label owners to access their designs anytime anywhere. Additionally, private designers will be able to post their unique designs in the library for label owners to view and purchase. Since finished designs will reside on the platform, the additional added value to designers will be that "knock offs" will be policed by comparing the digital design specifications and digital signatures of current library designs against the newly posted designs. Furthermore, designers will have access to "public" base designs which may be used as a starting point for their new concept or to test the new concept on varying styles.

The Technical Designer Network module will be implemented concurrent with the Proprietary Virtual Design Library and will expand the network of designers available by allowing any designer to enter the collaborative platform and do work for a monthly access fee. It is important to note that since a private label owners' designs will reside on the network, security measures will be implemented to ensure that only designers approved by the label owner will have access to individual designs and vice versa.

The eCAD and Production/Distribution Source Network Modules

The second two modules are the "eCAD" application and the Production/Distribution Source Network Modules. The eCAD module allows a label owner to collaborate on their collection in real time with approved designers located anywhere in the world using any of the available CAD software applications currently on the market. This work has traditionally been done through original artwork that is reworked by hand until the finished design is completed in an extremely time consuming process. Only recently has the industry moved toward digital design. And while designers have embraced the technology, collaborative design efforts have been severely limited by each designer's use of unique software and individual computers that were not or could not be connected. Even when connected, "collaboration" required the trading of extremely large CAD files among designers using exactly the same software. The CAS Platform will eliminate the need to trade files or to use exactly the same software as all collaborative work will occur on the Platform.

After a design is finalized, suppliers must be found to produce the fashions. The Production/Distribution Source Network module is utilized along with the eCAD" application in order to fill this function.

The Collaborative Web Portal and Pre-Production Engineering Resources Modules The third two modules are perhaps the most exciting of the CAS Platform as a network is created to allow the final approved designs and product specifications to be sent digitally to suppliers for production. This requires two final pieces of integration. First, the collaborative web portal will allow designs created in the various CAD software to be understood by the separate and currently unrelated production software. In this way, pre-production engineering specifications can be applied to a design which will allow that design to be produced by the selected supplier on his machinery. In other words, just as the earlier modules allow designers using separate software to collaborate, the collaborative web portal allows finished designs and manufacturing instructions on CAD to "collaborate" with suppliers for quicker and more accurate production. The pre-production engineering resources module will offer a way to pick from various pre-production engineers and engineering methods to collaborate and expedite the final pre-production approvals for the various production processes.

CAS Platform Support

The CAS Platform will further distinguish itself and establish itself as the Industry Standard for original design and pre-production development by providing a creative and execution support staff for each module who will be able to facilitate activity within that module. This service is intended to ease the transition to the platform by reducing the fear of designers, label owners, and suppliers in the transition to digital collaborative design and development.

Revenue Model

The Platform owner may generate and receive revenue from the CAS Platform in two distinct ways. First, access to the platform may be limited to designers, label owners and suppliers who pay a monthly fee for access. A separate fee may be required for each module. In this way individuals may pay to access only the modules in which they operate. These fees are designed to maintain the platform on an ongoing basis and to support research and development of continuing improvements to the platform. Second, a fee or commission will be applied to "Sales" occurring on the Platform. For example, the RTD3 CAS platform owner would take a fee for the sale of a private designer's design to a label owner. Also a commission could be charged for every piece produced through the platform. Finally, fees would be charged for platform support staff to lead a design through any module of the platform. A label owner new to the platform might pay the platform owner to quickly move their designs through the platform while they learn how the process works. it will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A real time design, development and delivery collaborative apparel solution digital platform comprising:

a virtual design library module;

a technical designer network module;

an eCAD module for facilitating design collaboration between a label owner and one or more approved designers;

a production/distribution source network module;

a collaborative web portal module for translating designs in a plurality of different CAD software applications to one or more of a plurality of unrelated production software applications; and a pre-production engineering resources module for facilitating the selection of pre-production engineers and engineering methods for various production processes.

* * * * *